Patented Jan. 16, 1923.

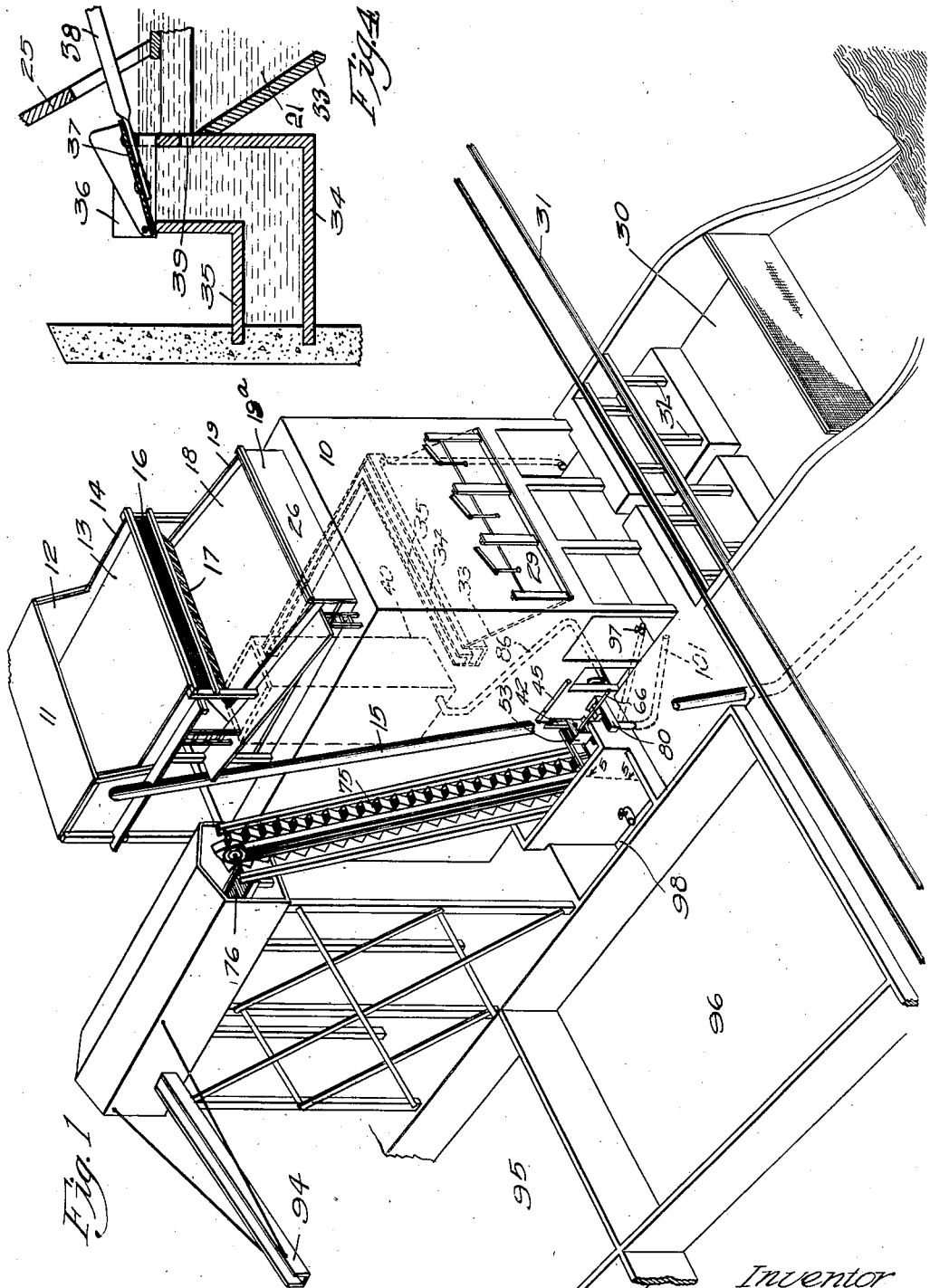

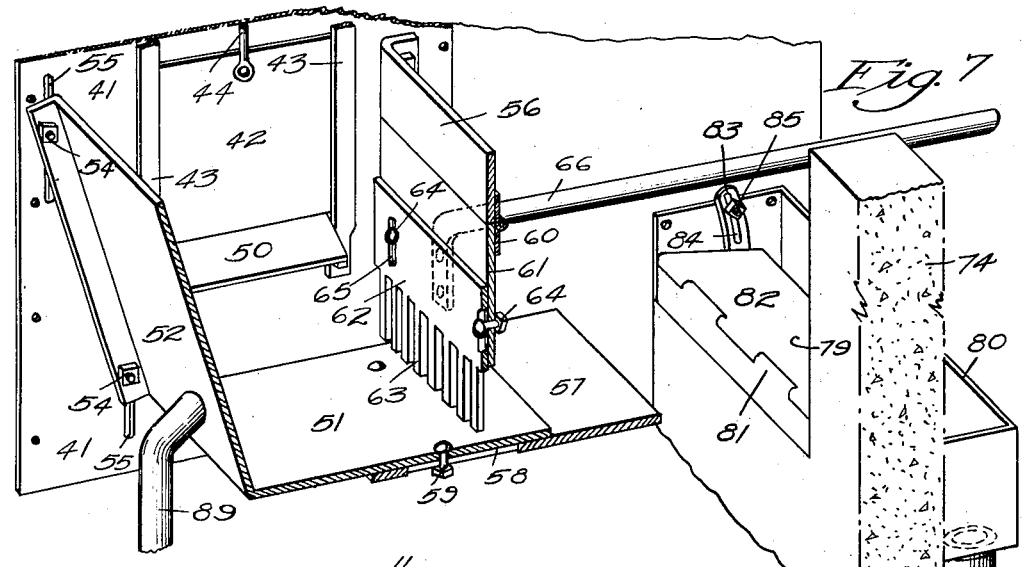
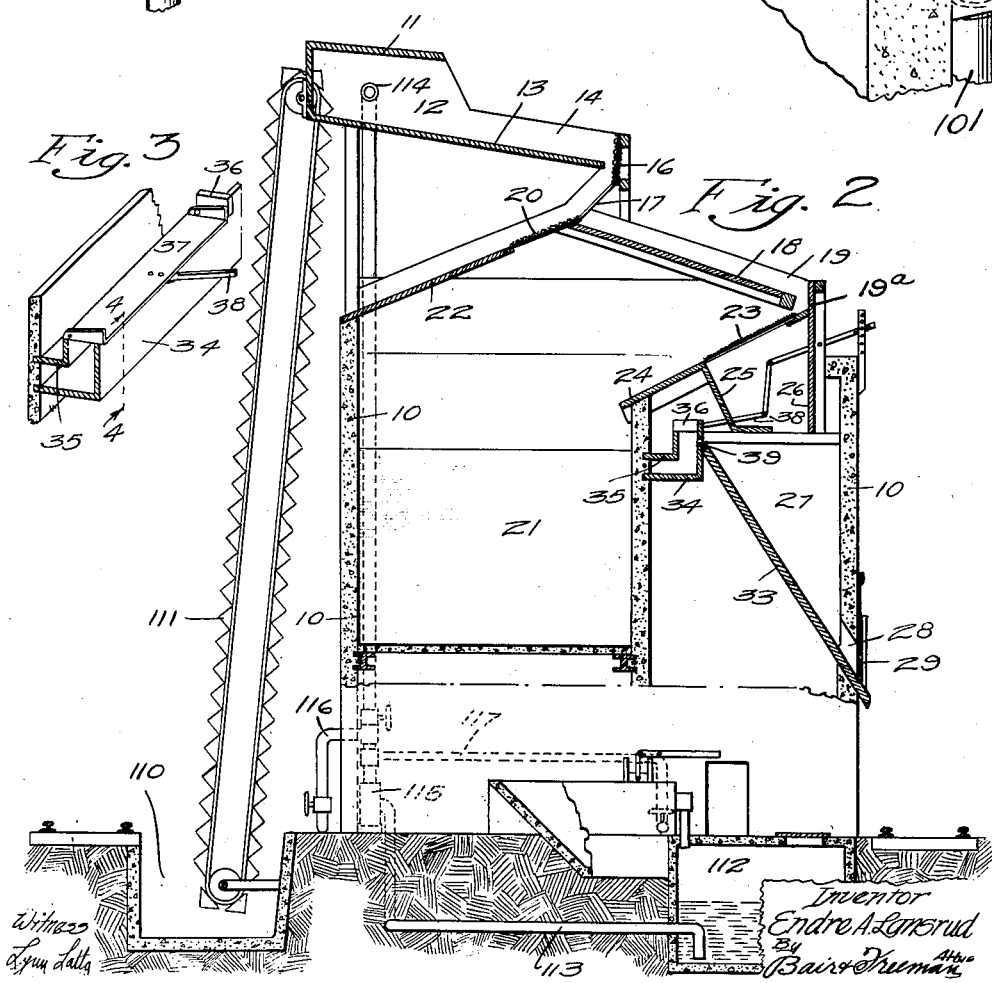

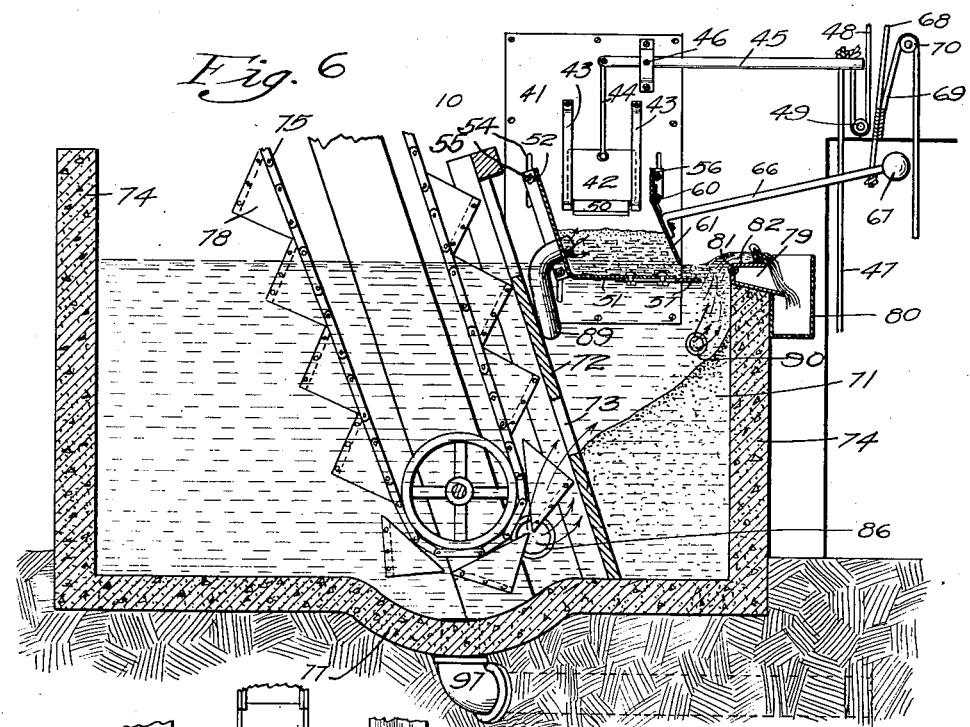
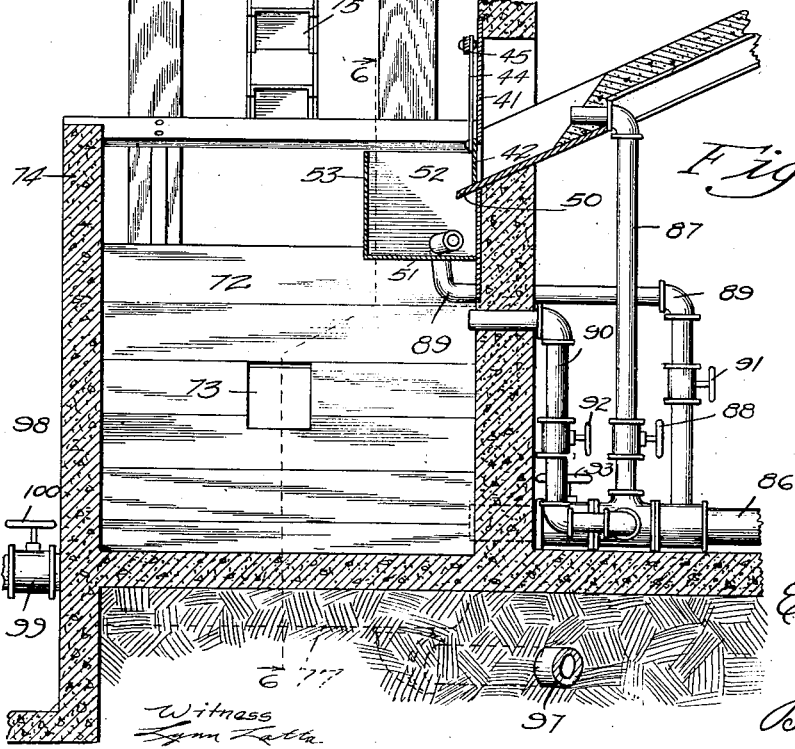

1,442,227

UNITED STATES PATENT OFFICE.

ENDRE A. LANSRUD, OF DES MOINES, IOWA, ASSIGNOR OF ONE-HALF TO A. O. HAUGE, OF DES MOINES, IOWA.

PROCESS AND APPARATUS FOR REMOVING FOREIGN MATTER FROM GRAVEL.

Application filed August 29, 1921. Serial No. 496,346.

*To all whom it may concern:*

Be it known that I, ENDRE A. LANSRUD, a citizen of the United States, and a resident of Des Moines, in the county of Polk and State of Iowa, have invented a certain new and useful Process and Apparatus for Removing Foreign Matter from Gravel, of which the following is a specification.

The object of my invention is to provide a process and an apparatus for removing foreign matter from gravel.

More particularly, it is my object to provide such a process and machine, whereby gravel may be conveniently and efficiently handled for washing, cleaning and separating dirt and foreign matter therefrom.

A further object is to provide such a process and apparatus, whereby water used in taking sand and gravel from a river bed or the like may be removed from the sand and gravel and part of such water may be used in cleaning and washing the gravel.

Still a further object is to provide such a process and apparatus, whereby the moving gravel is subjected to the action of an upwardly passing jet or current of water, whereby foreign material lighter than the gravel will be removed from the gravel and carried away.

Still a further object is to provide such a process and apparatus, whereby finer sand may be separated from the gravel and arranged in compartments convenient for discharging into a car or the like or for discharging back into the river.

Still a further object is to provide such an apparatus, having parts so constructed and arranged that the washing mechanism may be adjusted or manipulated to vary the operation thereof to properly handle and wash the gravel in all varying conditions in which such gravel may come from the river or the like.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a perspective view of a sand and gravel handling apparatus embodying my invention, whereby my process may be carried out.

Figure 2 shows a vertical, sectional view through the apparatus of a slightly modified form of the invention.

Figure 3 shows a perspective, sectional view of a portion of the flumes used in catching and handling the waste water.

Figure 4 shows a sectional view through the flume taken on the line 4—4 of Figure 3.

Figure 5 shows a vertical, sectional view through the gravel washing apparatus, taken on the line 5—5 of Figure 1.

Figure 6 is a sectional view taken on the line 6—6 of Figure 5; and

Figure 7 shows a detail, sectional, perspective view of the gravel discharge chute.

It may be said that in general my apparatus includes an elevated structure. The sand and gravel are carried to the top of this structure and are then discharged over certain platforms, screens and grizzlies into a large compartment from which the gravel is fed to the discharge chute.

As the gravel passes from the discharge chute, it is washed and cleansed of foreign material, and drops into the bin from which it is elevated to the shaker screens.

During the passage of the gravel through the elevated structure, part of the fine sand is separated and discharged into a suitable bin, from which it may be discharged into cars or into a chute leading to the river.

It may be mentioned that my apparatus is particularly designed for use where gravel is taken from a river, where it is likely to have considerable foreign matter, such as dirt, sticks, coal and the like, in it.

In the accompanying drawings, I have used the reference numeral 10 to indicate generally an elevated building or structure, having front, side and back walls. Above the elevated structure 10 is a box-like structure 11, open at one end, as at 12, and having an inclined bottom 13, projecting beyond the open end, as shown, and provided at its projecting portions with side walls 14.

The sand, gravel and water are drawn from the river or the like through a large pipe 15 and discharged against the back of the box 11. The material then travels down the inclined bottom and impinges against a screen 16 at the front end of the bottom 13.

The construction is such that the gravel and so forth strikes obstructions in order that mud balls and the like may be broken up.

The bottom 13 is of the same structure in the modified form shown in Figure 2, and terminates short of the screen 16, as illustrated in Figure 2.

The heavier sand and gravel drop off the forward end of the bottom 13 upon a grizzly 17. Some of the water and some of the fine sand travel through the screen 16 and drop upon an inclined floor or platform 18, which has sides 19. The greater part of the water, gravel, sand and foreign matter drops through the grizzly 17 upon the platform 18.

Below the grizzly 17 and inclined rearwardly therefrom is a screen 20, through which some gravel that may have passed over the grizzly with the oversize material drops into a compartment 21 in the elevated structure 10.

Inclined downwardly from the lower edge of the screen 20 is a discharge chute 22 for extra large boulders and gravel.

At the lower end of the platform 18, the material strikes against a wall 19$^a$ and the finer sand and water and some silt and dirt are discharged through a screen 23, inclined from its upper end rearwardly and downwardly as shown in Figure 2.

At the lower rear end of the screen 23 is an inclined platform 24 over which the gravel travels for discharge into the compartment 21.

The sand and water which pass through the screen 23 are guided by chute members 25 and 26 into a bin 27, having at its lower end discharge openings 28, which are controlled by slidable gates or the like 29.

In front of the elevated structure 10 of the preferred form of my device is a large chute or the like 30. A railroad track 31 extends across the chute 30 on supports 32 in such position, that cars on the track above the chute 30 may be filled from the bin 27.

It will be understood that the bin 27 will soon fill with water, which must be then taken care of. The rear wall of the bin 27, indicated at 33, is inclined, as shown. Adjacent to the upper edge of the rear wall 33 is a flume or trough 34. Within the flume or trough 34 is a smaller flume or trough 35. At certain points in the length of the flumes 34 and 35, the forward walls are cut away and are connected by members 36, as shown for instance in Figures 3 and 4.

Pivoted to the wall of the flume 35 in each cut-away portion thereof is the rear edge of what I may call a water-wing or gate 37, which extends forwardly from its hinge line across the flume 34, as shown for instance in Figures 3 and 4.

Levers or handles 38 are provided for manipulating the water-wings or gates 37. When the water gate or wing 37 is raised, it will be seen that water will flow over the upper edge of the wall 33 into the flume or trough 34. When, however, the water-wing 37 is lowered from its position shown in Figure 4 to its position shown in Figure 3, water will flow from the bin 27 over the water-wing or gate into the flume 35, and the cleaner water can thus be fed into the flume, as desired.

The flume 34 extends across the back of the bin 27 and preferably has a slot 39 to allow some water to flow into the flume 34 at all times when water in the bin 27 is high enough. The flume 35 extends from the bin 27 rearwardly to the upper part of a tank 40, shown in dotted lines in Figure 1.

The compartment or bin 21 has at one side a wall plate 41, shown for instance in Figure 7 and Figure 6. The plate 41 is provided with an opening, which is controlled by a sliding gate or door 42 slidably mounted in guides 43 on the outer side of said plate 41. A link 44 is secured to the door or gate 42 and also to a lever 45 pivoted at 46. A rope or the like 47 is secured to the forward end of the lever 45 and extended downwardly, so that the door or gate 42 may be manipulated from the lower part of the structure. A similar rope 48 is secured to the lever 45 and extended around a pulley 49 below the lever and thence upwardly, so that the door 42 may be controlled from the upper part of the structure.

A chute bottom member 50 extends from below the door 42 and is inclined into what I have called the gravel discharge chute, having a bottom 51, a back wall 52 and a side wall 53, as shown for instance in Figures 5, 6 and 7.

It will be understood that the plate 41 forms the other side wall of the gravel discharge chute.

The chute is vertically adjustable on the plate 41 and is supported by means of bolts 54 mounted in flanges on the chute and extended through elongated slots 55 in the plate 41. The front end of the chute is shown at 56 (Fig. 6).

The bottom member 51 projects beyond the front member 56 and has an adjustable extension member 57, provided with elongated slots 58 in which are received bolts 59 secured to the bottom member 51.

The front wall member 56 is located rearwardly from the front end of the discharge chute, and it will, of course, be understood that the bottom always terminates short of the front end of the discharge chute, so that sand and gravel may travel over the bottom member 57 and drop downwardly from the discharge chute.

Secured to the front end member 56 at the lower edge thereof by means of hinges 60 is a downwardly hanging partition member or the like 61 on which is supported a gate or the like 62. The gate 62 may have at its lower edge a series of slots 63. The gate 62 is adjustably mounted on the member 61 by means of bolts 64, which extend through elongated slots 65 in the gate 62.

Secured to the gate 62 is a pipe or rod 66 projecting forwardly. The forward end of the rod 66 is weighted, as at 67, for tending to hold the gate 62 down against the pressure of sand and gravel advancing toward the discharge end of the chute.

A rope or the like 68 extends upwardly from the forward end of the rod or the like 66 for controlling the rod 66 from the upper part of the structure. A similar rope 69 is secured to the rope 68 and is extended upwardly over a pulley 70 and thence downwardly for permitting the control of the rod 66 from the lower part of the structure.

At its forward end, the discharge chute, just mentioned, discharges into a compartment 71. The rear wall of the compartment 71 is slightly inclined as indicated at 72 and has a hole 73 therein.

It will be obvious that the gravel will tend to fill up the compartment 71 until it reaches the hole 73, when it will pass through such hole 73 into the bin 74.

A gravel elevator 75 extends from the lower part of the bin 74 upwardly to the shaker screens 76. The lower part of the bin 74 preferably has a transverse lowered portion 77, shown in Figure 6, just below the lower end of the elevator 75.

The elevator 75 is so arranged that its buckets 78 pass close to the opening 73 and receive the gravel discharged therethrough.

It is during the passage of the gravel and sand from the bottom member 57 of the discharge chute and through the compartment 71 that the main part of the cleaning operation takes place.

At the upper forward part of the compartment 71, there is provided a passage or opening 79, which discharges into a trough or the like 80.

For controlling the flow of water through the passage 79, there is hinged as at 81, a floor member or the like 82, which has ears provided with elongated slots 84 to receive bolts 85.

It will be understood that by loosening the nuts on the bolts 85, the floor member 82 may be raised or lowered for regulating the flow of water, which will be hereinafter more fully explained.

*Removal of foreign matter from sand and gravel.*

It has already been explained that water from the flume 35 passes into the tank 40. The water in the tank 40 is used for washing foreign matter from the sand and gravel during the passage of the sand and gravel through the compartment 71.

Leading from the bottom of the tank 40 is a pipe 86, shown in dotted lines in Figure 1. The pipe 86 leads to the lower part of the compartment 74 below the opening 73 and at the bottom of the elevator 75. A branch 87 leads from the pipe 86 to the lower part of the compartment 21 near the point of discharge therefrom and is designed to supply water for causing the sand and gravel to flow from the compartment 21 through the opening in the plate 41.

In the pipe 87 is a control valve 88. Another branch pipe 89 leads from the pipe 86 through the back wall 52 of the discharge chute to position for discharging water into the gravel that comes from the compartment 21. Still another branch 90 extends from the pipe 86 through a wall of the compartment 71 just below the point where the gravel drops downwardly off the bottom member 57, as illustrated in Figure 6.

In the pipe 89 is a control valve 91 and in the pipe 90 is a control valve 92. Between the branch pipes and the discharge end of the pipe 86 is a control valve 93.

Gravel is sized and graded by the shaker screens 76 and discharged through chutes 94 into bins 95, 96 and so on. A take-off pipe 97 leads from the depression 77 to the chute 30.

At the side of the compartment 74 is a tank or the like 98. A pipe 99 extends into the lower part of the compartment 74 and into the tank or compartment 98, so that the contents of the compartment 74 may be washed through the pipes 99 into the compartment 98, from which the dirt and refuse may be cleaned out by a steam shovel or any suitable way.

In the pipe 99 is a control valve 100. A pipe 101 leads from the trough or the like 80 to the chute 30.

In the practical use of my improved device and in the practice of my process the sand and gravel are first elevated in a suitable way and discharged upon the inclined bottom 13.

In the form of my invention heretofore described, the sand and gravel are raised through the pipe 15. The sand and gravel travel over the inclined bottom 13 and part of the water and fine sand is discharged through the screen 16 upon the inclined platform 18. The remaining water, sand and gravel travel through or over the grizzly 17, separating out the oversize material.

The oversize material then remaining passes over the screen 20, which allows any remaining gravel to pass through into the bin 21.

The sand and gravel slide over the end of the platform 18 upon the screen 23 and the water and the sand passes down against the wall 25 into the bin 27. The sand may be discharged from the bin 27 into the cars on the track 31, or if there are no cars, into the chute 30 and be washed back to the river. Superfluous sand may also be washed into the flume 34 through the slot 39 along with the surplus water, and from thence down through a discharge pipe into the chute 30. The water-wings or gates 37 may be controlled for causing as much of the water as is desired to flow into the flume or trough 35, and thence into the tank 40.

The gravel slides down over the platform 24 into the bin 21. It may be mentioned that it is important to have the gravel in as dry a condition as possible, so that it may flow readily into the discharge chute. It will be noted that the arrangement of the grizzlies and screens, whereby the sand and water are separated from the gravel, before the gravel reaches the bin 21, is advantageous for accomplishing this result.

It may also be mentioned that some sand will get into the bin along with the gravel and foreign matter and it is my object to remove this sand as well as the foreign matter with the washing apparatus described.

When the gate 42 is opened, the gravel goes from the compartment 21 into the discharge chute, where it is subject to the action of water flowing from the pipe 86, to cause a free flow past the swinging members 61 and 62.

I have found by actual use of the device, however, that the water is very seldom necessary to cause the flow of the gravel through the chute, and that the cleaning may be accomplished very satisfactorily by the use of the upward stream alone which, because of its slanting direction will produce the proper current over the wall 74.

The member 62 somewhat retards the passage of the gravel for permitting the water to wash out some of the lighter dirt and mud.

As the sand and gravel pass over the end of the bottom member 57, it is subjected to a strong upward current of water from suitably arranged openings in the pipe 86 through the opening 73, and, if necessary, from the pipe 90.

The heavier gravel drops downwardly into the compartment 71 while the dirt, sand, and sticks and foreign matter flow upwardly over the member 82, as particularly illustrated in Fig. 6. The moving gravel, being subject to the water from the pipe 89 is washed, and the current of water passing upwardly and also laterally toward the member 82 washes the gravel clean.

It is, of course, obvious that the member 82 can be adjusted and the member 57 and the swinging member 62 may also be adjusted to different working conditions. The valves can be used to control the relative strengths and flows of the horizontally traveling jet and the upwardly traveling jet of water. The upward spray or jet holds the lighter material near the top of the current of moving material and the laterally moving jet forces said lighter material over the member 82.

I have found that it is better to make the member 82 of considerable width rather than to force the discharging lighter material over a narrow wall or the like.

The washed gravel discharges through the opening 73 and is carried out by the elevator to the grading screens.

In Figure 2, I have shown a form of my invention in which the lower part of the structure is modified. I have shown at the back of the structure a pit or the like 110 in which sand and gravel may be placed and from which it may be elevated by the elevator 111 to the inclined bottom 13. A water tank 112 is provided to receive the waste water and a pipe 113 leads from the tank 112 upwardly to 114 where it discharges upon the sand and gravel upon the platform 13. The water is handled by a pump 115. Water may be pumped from an independent source of supply through a pipe 116.

The washing of the gravel is accomplished in the same way as that already described, water being taken for that purpose through a pipe 117 and through branch pipes similar to those already described.

The practice of my process will be understood from the foregoing description, and it is my intention to cover by my claims any modifications in the steps of my process or in the arrangement and construction of my device, which may be reasonably included within their scope.

I claim:

1. In an apparatus of the class described, an elevated structure, having a receiving member at its upper end formed with an inclined bottom, an upright screen spaced from the lower end of said inclined bottom, a grizzly below the lower end of said inclined bottom, inclined floors leading in opposite directions from said grizzly, means for supplying sand and gravel and water to said receiving member, said first screen being so arranged that water discharged therethrough will be received on one of said inclined bottoms for mingling with the material discharged through said grizzly.

2. In an apparatus of the class described, an elevated structure, having a receiving member at its upper end formed with an inclined bottom, an upright screen spaced from the lower end of said inclined bottom, a grizzly below the lower end of said inclined bottom, inclined floors leading in opposite directions from said grizzly, one of said floors having a screen therein, means for supplying sand and gravel and water to said receiving member, said first screen being so arranged that water discharged therethrough will be received on one of said inclined bottoms for mingling with the material discharged through said grizzly, a container below said second described inclined floor for receiving material and water passing through said second screen, an inclined floor for receiving material passing from that one of the second described inclined floors, which is not provided with a screen and arranged to discharge into said last described container.

3. In an apparatus of the class described, a chute device adapted to receive gravel, sand, water and the like, and having upright walls and a bottom, a passage at the discharge end of said chute, said bottom terminating short of said passage, means for throwing a jet of water upwardly between the end of said bottom and said passage into material flowing along said chute over the end of said bottom, and an adjustable floor element in said passage.

4. In an apparatus of the class described, a chute device adapted to receive gravel, sand, water and the like, and having upright walls and a bottom, a passage at the discharge end of said chute, said bottom terminating short of said passage, means for throwing a jet of water upwardly between the end of said bottom and said passage into material flowing along said chute over the end of said bottom, and a swinging gate member in said chute.

5. In an apparatus of the class described, a chute device adapted to receive gravel, sand, water and the like, and having upright walls and a bottom, a passage at the discharge end of said chute, said bottom terminating short of said passage, means for throwing a jet of water upwardly between the end of said bottom and said passage into material flowing along said chute over the end of said bottom, a swinging gate member in said chute, and an adjustable weight element on said swinging gate member.

6. In an apparatus of the class described, a chute device adapted to receive gravel, sand, water and the like, and having upright walls and a bottom, a passage at the discharge end of said chute, said bottom terminating short of said passage, means for throwing a jet of water upwardly between the end of said bottom and said passage into material flowing along said chute over the end of said bottom, and a swinging gate member in said chute, said gate element having a member adjustable toward and from the bottom of the chute.

7. In an apparatus of the class described, a bin, a chute above said bin having substantially upright sides and a bottom, said bottom terminating at a point to permit discharge of material over its end into said bin, a discharge passage spaced substantially horizontally from the end of said bottom, means for discharging an upwardly moving jet of water into material passing over the end of said bottom, means for discharging a substantially horizontal jet of water for carrying material along said chute, said discharge passage having an adjustable floor member.

8. In an apparatus of the class described, a bin, a chute above said bin having substantially upright sides and a bottom, said bottom terminating at a point to permit discharge of material over its end into said bin, a discharge passage spaced substantially horizontally from the end of said bottom, means for discharging an upwardly moving jet of water into material passing over the end of said bottom, said discharge passage having an adjustable floor member.

9. In an apparatus of the class described, a bin, a chute above said bin having substantially upright sides and a bottom, said bottom terminating at a point to permit discharge of material over its end into said bin, a discharge passage spaced substantially horizontally from the end of said bottom, means for discharging an upwardly moving jet of water into material passing over the end of said bottom, said discharge passage having an adjustable floor member, and an adjustable gate in said chute regulating the flow of material therein.

10. In an apparatus of the class described, an elevated structure, an inclined chute element at the top thereof, means for discharging sand and gravel against the wall of said inclined chute element at the upper portion thereof, a screen device forming a wall for said chute element at the lower end thereof, the bottom of said chute element terminating short of said screen, a grizzly below said screen and below the end of said bottom, where the latter is spaced from said screen, an inclined platform below said grizzly, a screen extending from said grizzly in the opposite direction from said platform, a platform below said last screen for taking off said oversize material, a screen below said first platform, a platform leading from said last screen, and a bin for receiving material discharged from said last platform and said second screen.

11. In a device of the class described, a bin having an inclined bottom an opening in the wall of said bin at the lower end of said bottom, an adjustable closure member for said opening, means for supplying a jet of water to the bottom of said bin at a point spaced from said opening, a chute for receiving material discharged through said opening, means for subjecting the material in said chute to a jet of water directly transversely of the flow of material into the chute and means for directing a jet of water upwardly through material flowing from the discharge end of said chute.

12. In a device of the class described, a bin having an inclined bottom, an opening in the wall of said bin at the lower end of said bottom, an adjustable closure member for said opening, means for supplying a jet of water to the bottom of said bin at a point spaced from said opening, a chute for receiving material discharged through said opening, means for subjecting the material in said chute to a jet of water directly transversely of the flow of material into the chute, and means for directing a jet of water upwardly through material flowing from the discharge end of said chute, and a discharge passage spaced from the end of said chute and arranged slightly above the level of the discharge end of said chute.

13. In a device of the class described, a bin having an inclined bottom, an opening in the wall of said bin at the lower end of said bottom, an adjustable closure member for said opening, means for supplying a jet of water to the bottom of said bin at a point spaced from said opening, a chute for receiving material discharged through said opening, means for subjecting the material in said chute to a jet of water directed transversely of the flow of material into the chute, means for directing a jet of water upwardly through material flowing from the discharge end of said chute, a discharge passage spaced from the discharge end of said chute, having an adjustable floor element, whereby the height of the discharge passage may be regulated.

14. In combination with a gravel sizing structure, a gravel cleaning device comprising a tank, a gravel bin adjacent to said tank, an opening in said bin, a chute below said opening, said chute being adapted to be partly immersed in the water, a door closing the mouth of said chute, said door being hinged for adjustment in various positions, said chute terminating close to a wall of said tank, a gap formed between the chute and said wall and a wall having a lowered portion opposite the end of said chute.

Des Moines, Iowa, August 15, 1921.

ENDRE A. LANSRUD.